United States Patent [19]

Gaylord

[11] 4,269,958

[45] May 26, 1981

[54] PEROXYGEN COMPOUND-STANNOUS CHLORIDE REDOX CATALYST SYSTEM FOR SUSPENSION POLYMERIZATION OF VINYL CHLORIDE

[75] Inventor: N. Grant Gaylord, New Providence, N.J.

[73] Assignee: Dart Industries Inc., Los Angeles, Calif.

[21] Appl. No.: 106,333

[22] Filed: Dec. 21, 1979

[51] Int. Cl.$^3$ ............................................. C08F 14/06
[52] U.S. Cl. .................................. 526/192; 526/213; 526/216; 526/221
[58] Field of Search ................ 526/192, 213, 216, 221

[56] References Cited

U.S. PATENT DOCUMENTS 3,668,194   6/1972   Shen ...................................... 526/192

*Primary Examiner*—William F. Hamrock
*Attorney, Agent, or Firm*—Bryant W. Brennan; Harold R. Beck

[57] ABSTRACT

A process for the suspension polymerization of vinyl chloride, in the presence of a redox catalyst system consisting of a peroxyester or diacyl peroxide and stannous chloride.

6 Claims, No Drawings

PEROXYGEN COMPOUND-STANNOUS CHLORIDE REDOX CATALYST SYSTEM FOR SUSPENSION POLYMERIZATION OF VINYL CHLORIDE

FIELD OF THE INVENTION

This invention relates to a process for the suspension polymerization of vinyl chloride, using a redox catalyst system consisting of a peroxyester or a diacyl peroxide and stannous chloride.

BACKGROUND OF THE INVENTION

The suspension polymerization of vinyl chloride is generally carried out at temperatures below 70° C. using organic soluble initiators. Although lauroyl peroxide was earlier the most widely used catalyst, in recent years other low temperature catalysts including azobisisobutyronitrile, diisopropyl peroxydicarbonate, t-butyl peroxypivalate and mixtures thereof, have been adopted. These and other catalysts are described in Pennwalt Corporation, Lucidol Division, Technical Bulletin 30.90, "Free Radical Initiators for the Suspension Polymerization of Vinyl Chloride" (1977).

The choice of initiator is dictated by its half-life and by its influence on the polymerization process and the properties of the poly(vinyl chloride) produced thereby.

The polymerization of vinyl chloride is characterized by a short induction period, followed by a gradually increasing rate of polymerization. During the earlier stages of the polymerization, the reaction rate is lower than the maximum so that the capacity of the reactor is not fully utilized. Peroxyesters reduce the induction period and, due to a more constant rate of polymerization, increase reactor productivity. Further, peroxyesters can generally be used at levels below that needed for peroxides and give much less chain branching during polymerization.

Although peroxyesters such as diisopropyl peroxydicarbonate and t-butyl peroxypivalate offer numerous advantages in vinyl chloride polymerization, their disadvantages include the necessity for low temperature shipping and storage and decreased efficiency at elevated temperatures.

The use of peroxyesters having higher decomposition temperatures is not feasible in present poly(vinyl chloride) production facilities due to the higher monomer pressures involved and the low molecular weight and poorer stability of the resultant resins. Nevertheless, the handling advantages of such peroxyesters makes their use extremely attractive.

The use of higher temperature catalysts at lower temperatures is a common practice in polymer technology. Thus, redox systems such as ammonium persulfate-sodium metabisulfite and hydrogen peroxide-ferrous sulfate are used in emulsion polymerization while benzoyl peroxide-dimethylaniline and methyl ethyl ketone peroxide-cobalt naphthenate are used in styrene-unsaturated polyester polymerization.

Reducing agents used in conjunction with monomer-soluble peroxyesters in the polymerization of vinyl chloride include potassium metabisulfite (N. Fischer and C. Lambling, French Pat. No. 2,086,635 (1972), sodium bisulfite (H. Minato, K. Hashimoto, and T. Yasui, Japan. Pat. No. 68 20,300 (1968), sodium bisulfite-cupric chloride (B. K. Shen, U.S. Pat. No. 3,668,194 (1972), sodium dithionite-ferrous sulfate (H. Minato, Japan. Pat. No. 70 04,994 (1970) and trialkyl boron (R. Kato and I. Soematsu, Japan. Pat. No. 5498('65) (1965); A. V. Ryabov, V. A. Dodonov, and Y. A. Ivanova, Tr. Khim. Khim. Tekknol., 1970, 238; Stockholms Superfosfat Fabriks A/B, Brit. Pat. No. 961,254 (1964).

Reducing agents used in conjunction with monomer-soluble diacyl peroxides in the polymerization of vinyl chloride include ferrous sulfate-sodium hydroxide (A. M. Sharetskii, S. V. Svetozarskii, E. N. Zil'berman, and I. B. Kotlyar, Brit. Pat. No. 1,164,250 (1969) and U.S. Pat. No. 3,594,359 (1971), ferrous caproate (J. Ulbricht and N. V. Thanh, Plaste Kaut., 21, 186 (1974); J. Ulbricht and G. Mueller, Plaste Kaut., 21, 410 (1974) and trialkyl boron (A. V. Ryabov, V. A. Dodonov, and Y. A. Ivanova, Tr. Khim. Khim. Tekknol., 1970, 238).

The water-soluble reducing agents are more suitable for emulsion than for bulk or suspension polymerization, the presence of iron compounds is detrimental to the properties of poly(vinyl chloride) and the trialkyl borons react with oxygen and require special handling.

SUMMARY OF THE INVENTION

An object of the present invention is to provide a process for the polymerization of vinyl chloride, in the presence of peroxygen compounds at temperatures at which the latter are stable and readily handled. Another object of the present invention is to provide a process for the suspension polymerization of vinyl chloride at temperatures below 70° C. using peroxygen compounds which, at these temperatures, do not generate free radicals at a sufficient rate to initiate polymerization at a practical rate, if at all.

It has now been found that this improvement in vinyl chloride polymerization can be achieved by utilizing a redox catalyst system consisting of a peroxyester or a diacyl peroxide and stannous chloride.

DETAILED DESCRIPTION OF THE INVENTION

According to the present invention, the polymerization of vinyl chloride is carried out in suspension, under the conditions applicable thereto and well known to those skilled in the art, using a catalyst system consisting of a monomer-soluble peroxyester or diacyl peroxide and a reducing agent which is stannous chloride.

The half-life of a free radical catalyst is the time required for 50% decomposition at a particular temperature. The half-life is only relevant as regards the temperature at which it is desired to conduct a polymerization, e.g. the polymerization of vinyl chloride below 70° C. to produce poly(vinyl chloride) with greater thermal stability than polymer produced above 70° C. The half-life of a peroxyester refers to thermal decomposition and, consequently, if a polymerization is to be conducted at 50° C., a catalyst with a half-life of 20 hours or less at 50° C., can be used for the polymerization, e.g. t-butyl peroxypivalate or t-butyl peroxyneodecanoate, as is well known to those skilled in the art.

However, if it is desired to conduct the polymerization with a catalyst which does not require refrigerated shipment and/or storage, which are required by t-butyl peroxypivalate and t-butyl peroxyneodecanoate, than in accordance with the present invention, a catalyst with a half-life of more than 50 hours at 50° C. can be used in the presence of a suitable reducing agent, e.g. t-butyl peroxyoctoate which has a half-life of 133 hours at 50° C. in the absence of the reducing agent may be used.

Alternatively, if it is desired to conduct polymerization at or below 25° C., in order to maintain better control of the reaction exotherm or to obtain a higher molecular weight, less branched polymer, the aforementioned peresters, despite the requirement for refrigerated shipping and storage, having half-lives of more than 150 hours at 25° C., may be used in the presence of a suitable reducing agent.

The process of the present invention utilizes a peroxygen compound such as a peroxyester and a diacyl peroxide, in the presence of a suitable reducing agent, at a temperature where the peroxygen compound has a half-life of more than 50 hours in the absence of the reducing agent.

The peroxyesters which may be used in the process of the present invention are the alkyl and aralkyl peroxyesters of aliphatic or aromatic carboxylic acids or carbonic acid and may be represented by the structural formula

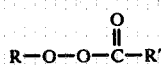

where R is an alkyl, aralkyl or alkoxycarbonyl group, R' is an alkyl, aralkyl, aryl or alkoxy group, and R and R' are the same or different. When R and/or R' contain alkyl or aralkyl moieties, the latter may contain 1-20 carbon atoms and may be primary, secondary or tertiary, linear or branched, acyclic or cyclic, saturated or unsaturated and may contain non-hydrocarbon substituents including halogen and hydroxyl groups. When R' is an aromatic moiety, it may be unsubstituted or may contain hydrocarbon, halogen and/or other substituents.

The peroxyesters may be monoperoxyesters or the diperoxyesters of dicarboxylic acids or diols.

Representative peroxyesters include t-butyl peroxyacetate, t-butyl peroxyisobutyrate, t-butyl peroxypivalate, t-butyl peroxyneodecanoate, t-butyl peroxybenzoate, t-butyl peroxyoctoate, t-butyl peroxy(2-ethylhexanoate), t-amyl peroxyneodecanoate, cumyl neodecanoate, isobutyl peroxypivalate, sec-butyl peroxybenzoate, n-butyl peroxyoctoate, t-butyl peroxy-3,3,5-trimethylhexanoate, t-butyl peroxy-2-methylbenzoate, 2,5-dimethyl-2,5-bis(2-ethylhexanoylperoxy)hexane, 2,5-dimethyl-2,5-bis(benzoylperoxy)hexane, 2,5-dimethyl-2,5-bis(octanoylperoxy)hexane, di-t-butyl diperoxyphthalate, t-butyl peroxymaleic acid, t-butyl peroxyisopropylcarbonate, di(sec-butyl) peroxydicarbonate, bis(4-t-butylcyclohexyl)peroxydicarbonate, diisopropyl peroxydicarbonate, di(n-propyl)peroxydicarbonate, di(2-ethylhexyl)peroxydicarbonate, dicyclohexyl peroxydicarbonate, dicetyl peroxydicarbonate and the like.

Aliphatic diacyl peroxides including acetyl peroxide, lauroyl peroxide, decanoyl peroxide and isononanoyl peroxide, as well as aromatic diacyl peroxides including benzoyl peroxide, p-chlorobenzoyl peroxide and 2,4-dichlorobenzoyl peroxide may be used in conjunction with the reductants of the present invention at a temperature where the diacyl peroxide has a half-life of more than 50 hours in the absence of the reductant.

The process of the present invention is carried out with a redox catalyst system consisting of a monomer-soluble peroxygen compound and a monomer-insoluble reductant, stannous chloride.

The peroxygen compound/reductant mole ratio is generally 1/0.01-2, with a preferred mole ratio of 1/0.1-1. The concentration of peroxygen compound is generally 0.01-5% by weight of the vinyl chloride, with a preferred concentration of 0.05-1% by weight.

The stannous chloride which is used as reductant in the present invention may be the anhydrous salt or the hydrated salt.

The reaction of diacyl peroxides and peroxyesters with stannous chloride in acid solution has been used in the quantitative analysis of the peroxygen compounds. In one procedure, the reaction with benzoyl peroxide and phthaloyl peroxide was carried out with excess stannous chloride in acid solution and the unused stannous chloride in the warm solution was back-titrated with standard iodine solution. In another procedure, the analysis of benzoyl peroxide was carried out by holding a mixture of the peroxide and stannous chloride in acetic acid at room temperature for 1 hour, followed by the addition of a boiling solution of ferric alum in sulfuric acid and ammonium chloride. The ferrous ions formed by reaction with the unused stannous chloride were titrated with potassium dichromate solution using diphenylamine sulfonic acid as indicator. These methods are described in R. M. Johnson and I. W. Siddigi, "The Determination of Organic Peroxides," Pergamon Press, 1970, pages 40–41.

The recommended procedure for the analysis of t-butyl peroxyoctoate involves the addition of a solution of stannous chloride in acetic acid to an acetic acid solution of the peroxyester. The mixture is allowed to react at room temperature for 10 minutes and the unreacted stannous chloride is back-titrated with potassium iodate solution (Pennwalt Corp., Lucidol Division, Analytical Procedure P-52-1, 1976).

The reaction of the peroxygen compounds with stannous chloride in the presence of acetic acid, is apparently rapid and complete enough at room temperature to serve as a quantitative assay method. Notwithstanding the absence of any disclosure as to the nature of the intermediates, i.e. radical or ionic, or the products of the reduction of the peroxygen compounds, the extreme rapidity of the reaction precludes its use in the polymerization of vinyl chloride.

This was confirmed by the attempted suspension polymerization of vinyl chloride in the presence of t-butyl peroxyoctoate, stannous chloride and acetic acid. The yield of polymer was 5% after 13 hours at 50° C., indicating that the solubilization of the stannous chloride in the vinyl chloride, as a result of the presence of acetic acid, resulted in the rapid decomposition of the peroxyester and a failure to effectively initiate vinyl chloride polymerization.

In contrast, when the acetic acid was omitted, the suspension polymerization of vinyl chloride in the presence of t-butyl peroxyoctoate and stannous chloride, surprisingly gave an 82% yield of polymer after 13 hours at 50° C. This may be attributed to the interaction of the monomer-insoluble stannous chloride with the peroxyester in the vinyl chloride, at the water-monomer droplet interface at a slow rate.

In the absence of stannous chloride, t-butyl peroxyoctoate failed to initiate the suspension polymerization of vinyl chloride after 20 hours at 50° C.

The procedures normally used in the suspension polymerization of vinyl chloride are applicable to the process of the present invention. Typical procedures are described in Encyclopedia of Polymer Science and Technology, 14, 339–343 (1971), the disclosure of which is incorporated herein by reference.

The polymerization may be conducted at or above atmospheric pressure. In the usual procedure, the reactor is charged at atmospheric pressure and the pressure rises when the contents of the reactor are brought to reaction temperature. The pressure may increase further due to the reaction exotherm and then remain constant until the conversion reaches about 70%, after which it decreases rapidly as the reaction continues.

The polymerization temperature may range from $-50°$ to $+70°$ C. for bulk polymerization, although temperatures of 40° to 60° C. are preferred. Suspension polymerization may be carried out at temperatures of $+5°$ to $+70°$ C., although preferred temperatures are in the 20°–60° C. range.

The concentrations of monomer and water, e.g. about 2/1 weight ratio, and the types and concentrations of suspending agents are those normally used in suspension polymerization and are well known to those skilled in the art. Typical suspending agents include poly(vinyl alcohol), partially saponified poly(vinyl acetate), gelatin, methylcellulose, vinyl acetate-maleic anhydride copolymer and the like. Various emulsifiers such as sulfonated oils and ethylene oxide condensation products may be added to control surface tension and particle shape. Buffers may be used, where necessary, e.g. when gelatin is used as suspending agent. Chain transfer agents such as chlorinated hydrocarbons and isobutylene may be used in the preparation of low molecular weight polymer.

Although the peroxygen compound-stannous chloride catalyst system of the present invention is particularly useful in the suspension polymerization of vinyl chloride, the redox system may also be used in the copolymerization of vinyl chloride with vinylidene chloride, vinyl acetate and other monomers which undergo copolymerization with vinyl chloride.

EXAMPLE I

A 4 oz glass bottle was charged with the following suspension recipe:
21 ml distilled water (boiled)
1 ml 1% aqueous solution of Tween 60 (polyoxyethylene sorbitan monostearate, Atlas Chemical Industries Inc.)
1 ml 1% aqueous solution of Span 60 (sorbitan monostearate, Atlas Chemical Industries Inc.)
2 ml 1% aqueous solution of Methocel A-15 (methylcellulose with viscosity of 15 cps as a 2% aqueous solution, Dow Chemical Co.)
Nitrogen was bubbled through the aqueous solution for 15 minutes.

Gaseous vinyl chloride was purified by passage through two 5% aqueous sodium hydroxide solutions, dried by passage through a silica gel column and then condensed with the aid of a dry ice bath. After 10 g liquid vinyl chloride and 0.052 g (0.23 mmole) stannous chloride dihydrate were added to the suspension recipe, the bottle was closed with a screw cap containing a center hole and a self-sealing gasket. The addition of 0.055 ml (0.23 mmole) t-butyl peroxyoctoate (0.5% by weight of vinyl chloride) was made by injection through the gasket using a hypodermic syringe. The bottle was placed in a 50° C. constant temperature bath and shaken for 13 hours. The bottle was removed from the bath and the residual monomer was released by inserting a needle into the gasket. The yield of poly(vinyl chloride) was 8.2 g (82% conversion).

EXAMPLE II

A bottle was charged in the same manner and with the same reactants as in Example I, except for the omission of stannous chloride dihydrate. No polymer was isolated after 20 hours at 50° C.

EXAMPLE III

A bottle was charged in the same manner and with the same reactants as in Example I, except that 2 ml glacial acetic acid was added to the reaction mixture before the addition of the t-butyl peroxyoctoate. After 13 hours at 50° C. the yield of poly(vinyl chloride) was 0.5 g (5% conversion).

While particular embodiments of this invention have been disclosed above, it will be understood that the invention is obviously subject to variation and modification without departing from its broader aspects.

What is claimed is:

1. A process for the preparation of polymers and copolymers of vinyl chloride, which consists in suspension polymerization at a temperature of 70° C. or below, in the presence of a redox catalyst system consisting essentially of a peroxygen compound selected from the class consisting of peroxyesters and diacyl peroxides, and stannous chloride wherein the polymerization is carried out at a temperature wherein the peroxygen compound has a half-life of more than 50 hours in the absence of stannous chloride.

2. The process of claim 1 wherein said polymerization temperature is in the range from $-50°$ to $+70°$ C.

3. The process of claim 1 wherein said polymerization temperature is between 20° and 60° C.

4. The process of claim 1 wherein said peroxyester is selected from the class consisting of alkyl peroxyesters of aliphatic carboxylic acids, aromatic carboxylic acids and carbonic acid.

5. The process of claim 4 wherein said peroxyester is t-butyl peroxyoctoate.

6. The process of claim 1 wherein said diacyl peroxide is selected from the class consisting of lauroyl peroxide and benzoyl peroxide.

* * * * *